United States Patent
Raghunath et al.

(10) Patent No.: US 7,725,573 B2
(45) Date of Patent: May 25, 2010

(54) METHODS AND APPARATUS FOR SUPPORTING AGILE RUN-TIME NETWORK SYSTEMS VIA IDENTIFICATION AND EXECUTION OF MOST EFFICIENT APPLICATION CODE IN VIEW OF CHANGING NETWORK TRAFFIC CONDITIONS

(75) Inventors: Arun Raghunath, Beaverton, OR (US); James L. Jason, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1092 days.

(21) Appl. No.: 11/288,586

(22) Filed: Nov. 29, 2005

(65) Prior Publication Data

US 2007/0169001 A1 Jul. 19, 2007

(51) Int. Cl.
*G06F 15/173* (2006.01)
*G06F 9/44* (2006.01)
*G06F 9/45* (2006.01)

(52) U.S. Cl. .................. 709/224; 717/130; 717/140
(58) Field of Classification Search .............. 709/224
See application file for complete search history.

(56) References Cited

U.S. PATENT DOCUMENTS

| | | | |
|---|---|---|---|
| 5,704,011 A * | 12/1997 | Hansen et al. ........ 706/25 |
| 6,401,238 B1 * | 6/2002 | Brown et al. ........ 717/177 |
| 6,606,721 B1 * | 8/2003 | Gowin et al. ........ 714/728 |
| 6,832,367 B1 * | 12/2004 | Choi et al. ........ 717/130 |
| 7,225,264 B2 * | 5/2007 | Croman et al. ........ 709/232 |
| 7,328,134 B1 * | 2/2008 | Burbidge et al. ........ 702/186 |
| 7,394,823 B2 * | 7/2008 | Sano ........ 370/419 |
| 7,472,262 B2 * | 12/2008 | Sun ........ 712/237 |
| 2002/0194342 A1 * | 12/2002 | Lu et al. ........ 709/227 |
| 2003/0014491 A1 * | 1/2003 | Horvitz et al. ........ 709/206 |
| 2003/0065548 A1 * | 4/2003 | Schmidt ........ 705/9 |
| 2004/0154006 A1 * | 8/2004 | Heishi et al. ........ 717/140 |
| 2005/0010664 A1 * | 1/2005 | Hubbard ........ 709/224 |
| 2005/0220103 A1 * | 10/2005 | Wild et al. ........ 370/390 |
| 2006/0206881 A1 * | 9/2006 | Dodge et al. ........ 717/140 |
| 2006/0224825 A1 * | 10/2006 | Mogi et al. ........ 711/113 |
| 2007/0011734 A1 * | 1/2007 | Balakrishnan et al. ........ 726/13 |

* cited by examiner

*Primary Examiner*—Firmin Backer
*Assistant Examiner*—Ebrahim Golabbakhsh
(74) *Attorney, Agent, or Firm*—Blakely, Sokoloff, Taylor & Zafman LLP

(57) ABSTRACT

Methods and apparatus for supporting agile run-time network systems via identification and execution of most efficient application binary code in view of changing network traffic conditions. Under one embodiment of the method, respective application binaries are compiled for each of a plurality of profiled system states for a network system, wherein each profiled system state corresponds to a respective workload scenario for the network system. During ongoing run-time operations, the current workload condition for the network system is monitored, and an application binary from amongst the multiple application binaries that is most efficient for the current workload condition is identified, loaded and executed.

19 Claims, 8 Drawing Sheets

METHODS AND APPARATUS FOR SUPPORTING AGILE RUN-TIME NETWORK SYSTEMS VIA IDENTIFICATION AND EXECUTION OF MOST EFFICIENT APPLICATION CODE IN VIEW OF CHANGING NETWORK TRAFFIC CONDITIONS

FIELD OF THE INVENTION

The field of invention relates generally to networking equipment and, more specifically but not exclusively relates to techniques for implementing agile run-time network systems via identification and execution of most efficient application code in view of changing network traffic conditions.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. To process a packet, the network processor (and/or network equipment employing the network processor) extracts data from the packet header indicating the destination of the packet, class of service, etc., stores the payload data in memory, performs packet classification and queuing operations, determines the next hop for the packet, selects an appropriate network port via which to forward the packet, etc. These operations are generally referred to as "packet-processing" or "packet-forwarding" operations.

Modern network processors (also referred to as network processor units or NPUs) perform packet processing using multiple multi-threaded processing elements (e.g., processing cores) (referred to as microengines or compute engines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

In general, the various packet-processing compute engines of a network processor, as well as other optional processing elements, will function as embedded specific-purpose processors. In contrast to conventional general-purpose processors employed on personal computers and servers, the compute engines do not employ an operating system to host applications, but rather directly execute "application" code using a reduced instruction set tailored for packet-processing tasks. For example, the microengines in Intel's® IXP2xxx family of network processors are 32-bit RISC processing cores that employ an instruction set including conventional RISC (reduced instruction set computer) instructions with additional instructions specifically tailored for network packet-processing.

The services supported by a typical network device or system may be numerous. For example, typical services include packet-forwarding with and without Quality of Service (QoS) levels, security, Voice over IP (VoIP), streaming video, subscriber differential services, etc. To effect each particular service, a specific set of code or code modules is developed that is tailored for that service. Additionally, sets of services are typically grouped into an application that is run on the network device. Moreover, a given network device may run one or more applications.

Typically, the application code is generated in the following manner. First, the developers write source code targeted for a particular application and a particular execution environment (e.g., a particular NPU or processing architecture employing multiple NPUs, or multiple single- and/or multi-core processors). The source code is fed into a compiler that generates an intermediate representation comprising original binary code with added instrumentation code. The intermediate representation code is executed in the targeted environment (actual hardware or a virtual model) with what is deemed a representative input (e.g., training data), and profiling statistics are gathered via hooks in the instrumentation code. The statistics, along with the original binary code are then fed to the compiler, which generates a binary executable that is optimized based on the profiling statistics.

This approach has several problems. First, the optimized code is only as good as the provided training data. If the real-world data encountered diverges greatly from the training data, the application may perform sub-optimally. Second, if the real-world workload (i.e., traffic conditions) varies over time, as is very common in many network systems, the single, static executable is unable to adapt and optimize itself for the change in workload. Third, for a system that will encounter varying workloads over time, attempting to structure the training data so that it represents all or most of the typically workload scenarios that might be encountered during actual operations leads to a situation where it is very unlikely that the executable is optimized for any individual workload—resulting in a "jack-of-all-trades-master-of-none" situation.

In view of the foregoing, program developers must make a tradeoff of either (1) optimizing their code to handle one case very well and hope for acceptable performance for any traffic condition that doesn't match the optimized case; or (2) attempt to get the best average performance, knowing that their system will never have the best performance for any individual type of network-packet traffic. This is especially true for network systems that support a large number of services, often placing very different kinds of demands on system resources.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a diagram illustrating profile points in a three-dimensional space corresponding to respective profiled system states for the three services of FIG. 6a;

DETAILED DESCRIPTION

Figure 1A:
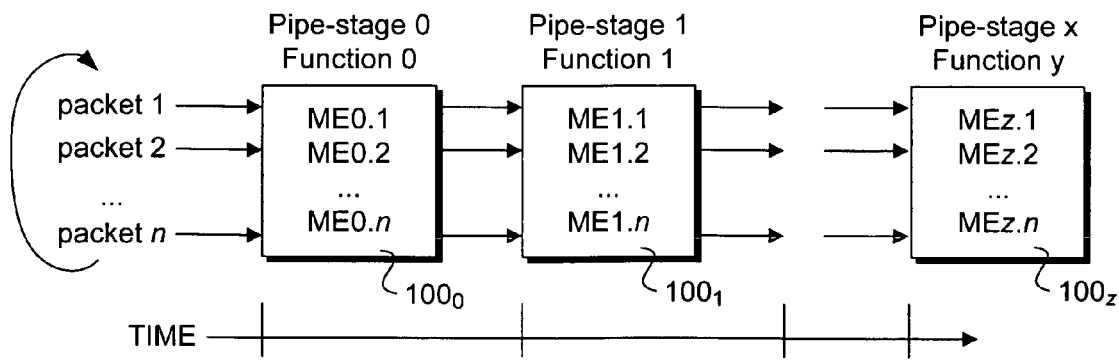
FIG. 1a is a schematic diagram illustrating a technique for processing multiple functions via multiple compute engines using a context pipeline.

Embodiments of methods and apparatus for supporting agile run-time systems via selection of appropriate application code in view of current network traffic conditions are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In order to better appreciate the difficulty in the tradeoffs developers have had to make under conventional approaches, one has to consider aspects of the execution environment particular to network systems. As discussed above, today's network systems, such as routers, backbone switches, etc., need to support multiple applications and services in view of dynamically changing network traffic and associated workloads. Additionally, they also need to forward as many packets as possible at line-rate speeds. In view of these and other requirements, the following architectural constraints are typically imposed for the network system:

1. Multiple Processing Elements are employed for packet processing. These are typically implemented as multi-core NPUs, multiple discreet processors, or a combination of the two.

2. Maintaining line-rate speeds requires predictable processing latencies. This is typically addressed by employing parallel packet-processing operations, and bifurcating packet processing into fast-path and slow-path processing paths.

3. Packet processing and application constraints in view of system hardware architectures dictate the use of shared memory resources.

Modern network processors, such as Intel's® IXP2xxx family of network processors, employ multiple multi-threaded processing cores (e.g., microengines) to facilitate line-rate packet processing operations. Some of the operations on packets are well-defined, with minimal interface to other functions. Examples include update-of-packet-state information, such as the current address of packet data in a DRAM buffer for sequential segments of a packet, updating linked-list pointers while enqueuing/dequeuing for transmit, and policing or marking packets of a connection flow. In these cases the operations can be performed within the predefined-cycle stage budget. In contrast, difficulties may arise in keeping operations on successive packets in strict order and at the same time achieving cycle budget across many stages. A block of code performing this type of functionality is called a context pipe stage or a functional pipe stage.

In a context pipeline, different functions are performed on different microengines (MEs) as time progresses, and the packet context is passed between the functions or MEs, as shown in FIG. 1a. Under the illustrated configuration, z MEs $100_{0-z}$ are used for packet processing operations, with each ME running n threads. Each ME constitutes a context pipe stage corresponding to a respective function executed by that ME. Cascading two or more context pipe stages constitutes a context pipeline. The name context pipeline is derived from the observation that it is the packet context that moves through the MEs running the stages of the pipeline.

Under a context pipeline, each thread in an ME is assigned a packet, and each thread performs the same function but on different packets. As packets arrive, they are assigned to the ME threads in strict order. For example, there are eight threads typically assigned in an Intel IXP2800® ME context pipe stage. Each of the eight packets assigned to the eight threads must complete its first pipe stage within the arrival rate of all eight packets. Under the nomenclature illustrated in FIG. 1, MEi.j, i corresponds to the ith ME number, while j corresponds to the jth thread running on the ith ME.

In functional pipelining, a single processing element performs different functions during different time stages, on the same cell/packet context. Consider a processing element that performs m consecutive functions on a cell/packet context; during each time stage, a processing element only performs one of the m functions. In order to avoid blocking the overall pipeline advancement as new cells/packets arrive, m processing elements work in parallel. These m processing elements form the functional pipeline. These m processing elements actually work in a staggered fashion, so that at any one stage in time, each processing element performs a different function out of the m functions. This staggering is needed because each function may demand exclusive ownership of some global state. In case each processing element supports n threads of multi-threading, it can process n different cell/packet contexts in a time-shared manner in each time stage. The advantage of functional pipelining is that the time budget each processing element has for operating on a cell/packet context is m×n×the cell/packet arrival rate. This time budget is m times bigger than the time budget that a context pipeline offers. In other words, functional pipelining accommodates very long latency functions efficiently. The disadvantages of functional pipelining include the relatively greater complexity or larger amount of software required in each processing element; each needs to perform m functions as opposed to one function for a context pipeline stage.

Figure 1B:
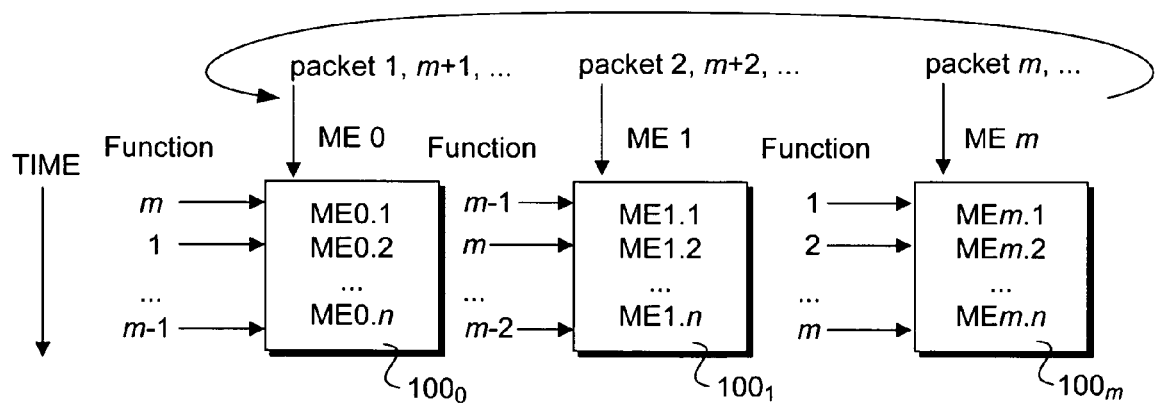
FIG. 1b is a schematic diagram illustrating a technique for processing multiple functions via multiple compute engines using function pipelining.

An example of a functional pipeline is illustrated in FIG. 1b. Under the illustrated approach, m processing functions are performed on each of m MEs $100_{0-m}$ in a staggered manner, such that at a given point in time (stage), each ME is performing a different function from among the m functions. Furthermore, each ME is depicted as employing a corresponding thread from among n threads for each function.

Figure 2:
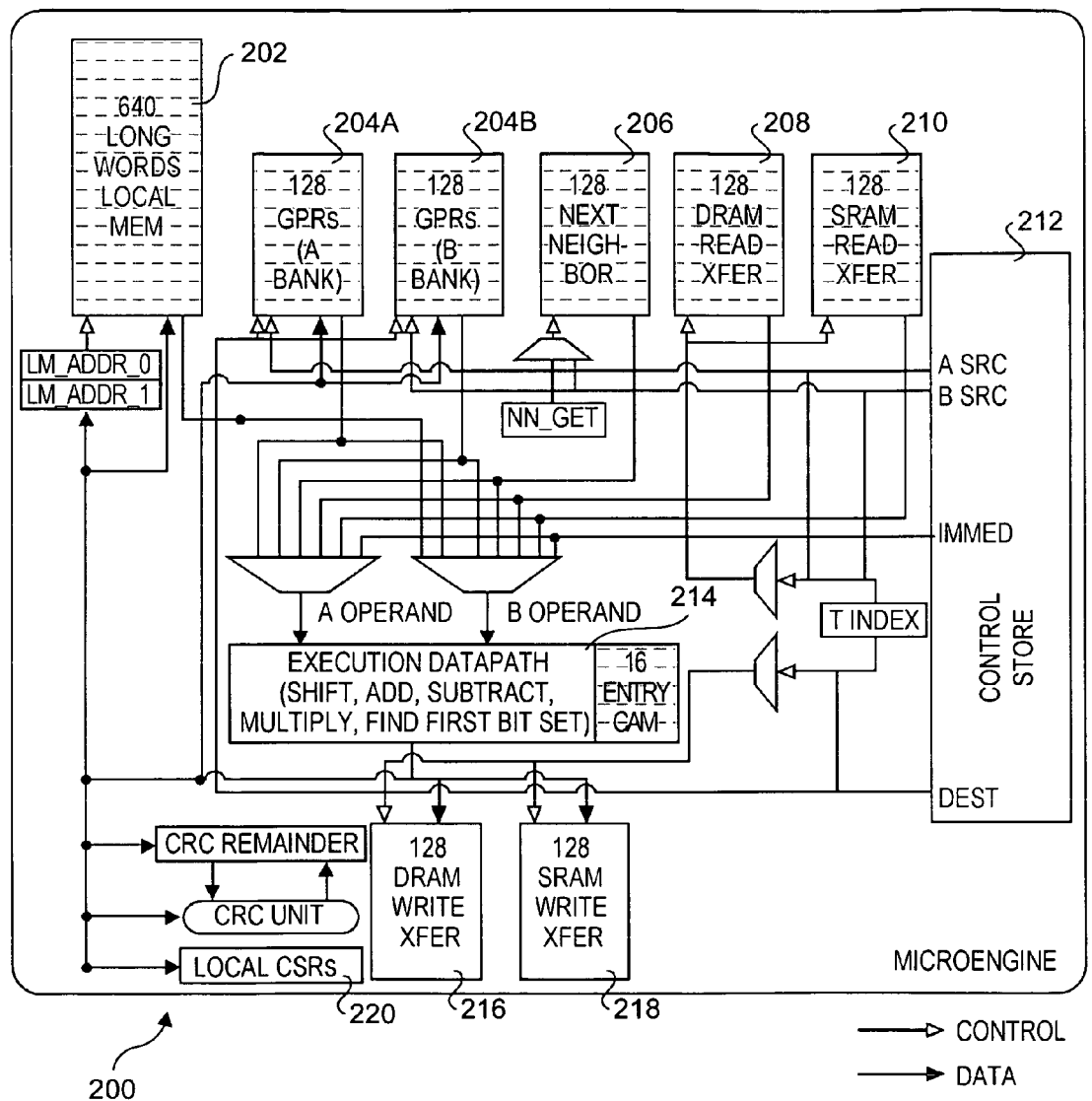
FIG. 2 is a schematic diagram of a microengine architecture.

A block diagram corresponding to one embodiment of a microengine architecture 200 is shown in FIG. 2. Architecture 200 depicts several components typical of compute-engine architectures, including local memory 202, general-purpose register banks 204A and 204B, a next neighbor register set 206, a DRAM read transfer (xfer) register set 208, an SRAM read transfer register set 210, a control store 212, execution datapath 214, a DRAM write transfer register set 216, and a SRAM write transfer register set 218.

Architecture 200 supports n hardware contexts. For example, in one embodiment n=8, while in other embodiments n=16 and n=4. Each hardware context has its own register set, program counter (PC), condition codes, and context specific local control and status registers (CSRs) 220. Unlike software-based contexts common to modern multi-threaded operating systems that employ a single set of registers that are shared among multiple threads using software-based context swapping, providing a copy of context parameters per context (thread) eliminates the need to move context specific information to or from shared memory and registers to perform a context swap. Fast context swapping allows a thread to do computation while other threads wait for input/output (IO) resources (typically external memory accesses) to complete or for a signal from another thread or hardware unit.

Under the embodiment illustrated in FIG. 2, the instructions for each of the threads are stored in control store 212. However, this does not imply that each thread executes the same instructions and thus performs identical tasks. Rather, the instructions are typically structured to perform multiple tasks. Generally, execution of the multiple tasks are structured to support multi-threaded processing techniques, wherein a given set of tasks are performed on a respective object being handled by a network processor that includes multiple microengines, such as packet-forwarding operations. For example, in one embodiment the set of tasks performed by a given microengine correspond to a sub-set of overall tasks performed by a layer-2 application (e.g., one thread manages data movement from memory, another does header processing, etc.) As discussed above, a particular set of tasks may be performed by threads running on one or more microengines in a cooperative manner.

The different services supported by today's network systems typically place vastly different demands on system resources. While a workload dominated by a compute-intensive service might require a particular mapping of the code onto the processing elements, another dominated by I/O (input/output) operations might require the system resources to be allocated in a totally different manner for efficient usage of the system.

Compiling applications by profiling them under a workload that represents the various scenarios that might be encountered by the system makes the creation of efficient binaries infeasible. The problem is not just that different workloads place different requirements on the system, but also that the workloads seen by a system vary a lot. Studies in the academic community as well as the industry have shown that workloads vary in time scales ranging from sub-second to minutes to hours to days. As such there is no representative workload and hence the approach of profiling with a particular workload results in inefficient binaries.

For example, consider the effect of having to access shared memory resources. As discussed below with reference to FIG. 10, while a typical network line card may employ one or more NPUs with multiple processing elements, memory resources, including SRAM and DRAM stores, are typically shared amongst the processing elements. Taken in isolation (with respect to performing packet-processing for a service), the sharing of memory resources, by itself, does not pose too difficult of problem with respect to latency delays causes by access contention issues, particularly if pipelined parallel processing techniques are employed. However, when multiple services are deployed on a network system, they are not run in isolation. Rather, multiple threads running on multiple processing cores must share access to the memory resources, leading to memory contention issues that can dramatically affect process latencies and processor utilization. Furthermore, while the pipeline for a single service may be tuned so that memory contention issues are minimized for that service, the tuning is performed in isolation. However, when the threads corresponding to the service are forced to wait to access memory resources due to the resources being accessed by other threads corresponding to other services, the corresponding application quickly becomes detuned, which may substantially reduce its efficiency and throughput.

In accordance with aspects of the embodiments now described, a methodology is disclosed that addresses changes in workloads by identifying the most efficient binary to execute from among a set of binaries available for execution in view of current traffic conditions. Under the methodology, executable code (binaries) corresponding to different expected workload scenarios (a.k.a., profiled system states) are compiled in the manner discussed above in the background section. In connection with the compilation of code for the expected workload scenarios, a mechanism is implemented for identifying the profiled system state that is nearest to a current workload condition, and the corresponding binary is loaded for execution on the host system. This process is then performed in a repeated manner, enabling the host system to change the code (binary(ies)) that is being executed for one or more applications in view of changes to the workloads associated with the application(s) at the current time. The basic idea is to switch to the appropriate binary for a given application when a given workload scenario for that application is encountered.

Figure 3:
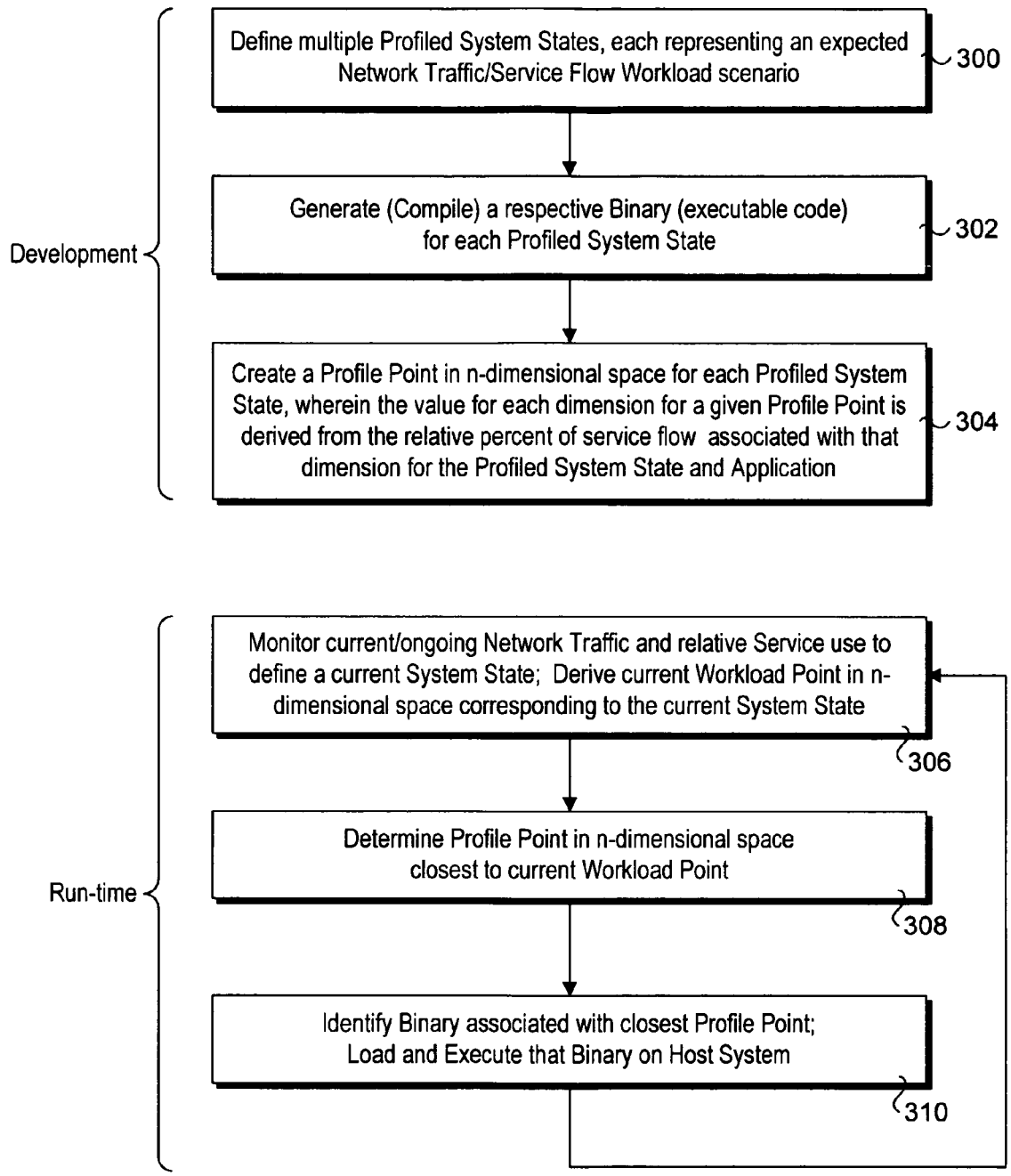
FIG. 3 is a flowchart illustrating operations performed during development and run-time operations to effect identification and execution of a most efficient binary in view of changing network traffic conditions, according to one embodiment of the invention.

An overview of the methodology is illustrated by the operations depicted in the flowchart of FIG. 3. As illustrated, the method's block operations are divided into two phases: a development phase and a run-time phase. The development phase operations are performed during development of the application code and in preparation for the subsequent run-time phase, which corresponds to ongoing operations performed by a host system in which the application code is deployed.

The development process begins in a block 300, wherein multiple profiled system states are defined. Each profiled system state corresponds to an expected/predicted workload scenario comprising a modeled and/or observed network traffic condition and associated services used to process packets corresponding to that traffic condition. Next, in a block 302, a respective binary is generated for each profiled system state. This allows the compiler to generate efficient code for each specific combination of service usage encountered by a given workload scenario being profiled.

A mechanism is implemented for identifying the profiled system state that is nearest to current workload condition. In order to achieve such functionality, there needs to be a mechanism for modeling the closeness between each profiled workload scenario and a current workload. In one embodiment, this is achieved by modeling each profiled workload scenario as a profile point in an n-dimensional space. In a similar manner, the currently observed workload is represented as another point in the n-dimensional space. The profile point closest (in mathematical distance) to the workload point is then determined, and the binary for the corresponding profiled workload scenario is loaded and executed.

The first portion of the process is performed in block 304 during the development phase. A profile point is created in an n-dimensional space for each profiled system state (i.e., modeled or observed workload scenario employed for generating a corresponding binary). Each dimension corresponds to one service of the application. The number of dimensions n corresponds to the number of services associated with the application. Meanwhile, the displacement along each dimension (i.e., data value) for a given profile point is derived from the relative percentage of each service in the overall traffic for the profile under consideration.

Figure 4:
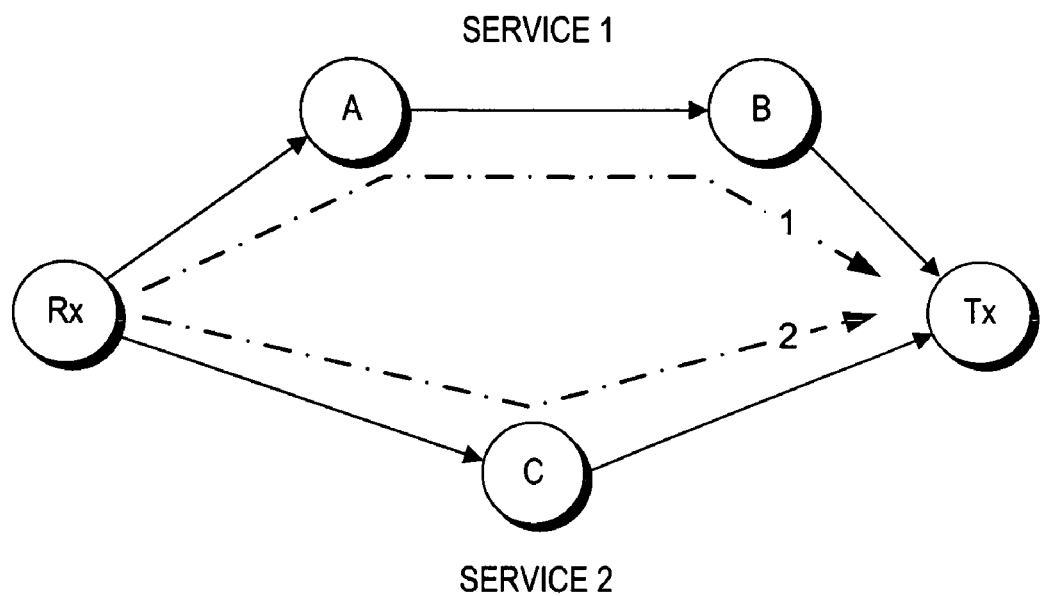
FIG. 4 is a dataflow graph depicting service flows for two exemplary services.
Figure 5:
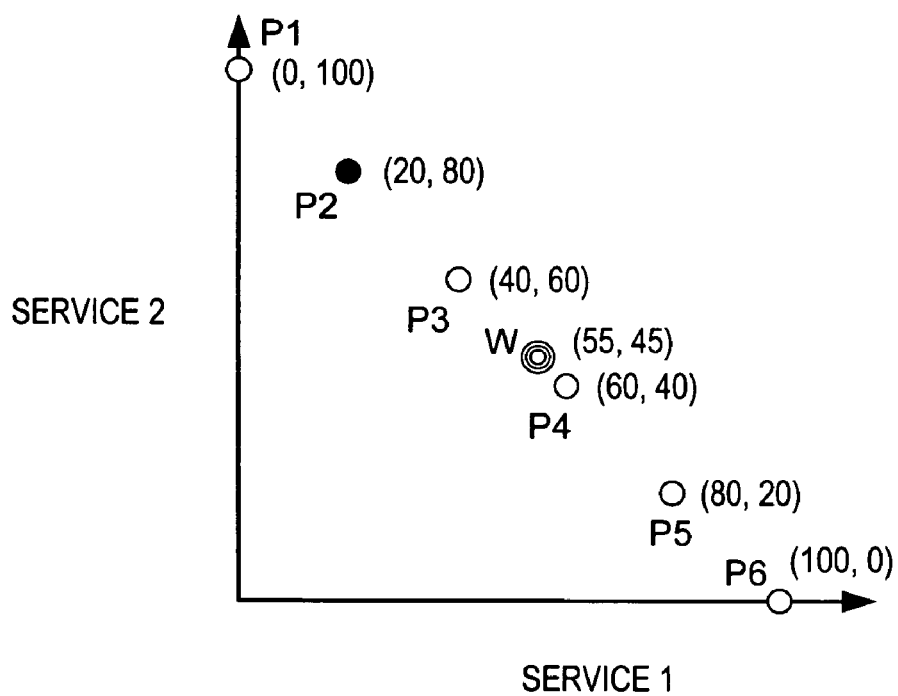
FIG. 5 is a graph illustrating profile points corresponding to respective profiled system states comprising associated combinations of the two services of FIG. 4 in a two-dimensional space.

For example, consider the implementation illustrated by the dataflow graph and workload profile models of FIGS. 4 and 5. FIG. 4 shows a dataflow graph modeling service processes employed by two services (service 1 and service 2), while FIG. 5 shows points representing various profiled system states (points P1-P6) for the two services 1 and 2 in a two-dimensional space. As shown in FIG. 4, the dataflow graph for service 1 begins at a receive (Rx) node, representing packets received at an I/O port or otherwise received at in input process. Generally, selected packets are assigned to a service path associated with service 1 using some form of classification scheme or the like. (It is noted that under some applications the operation of packet classification itself may comprise a separate service path.) The processing of the packets performed by service 1 is depicted by process nodes A and B. Upon completion of these processes, the packets are forwarded for transmission, as depicted by a transmit (Tx) node. Meanwhile, the processing for service 2 flows from the Rx node to a process node C, and then to the Tx node. (It is noted that the dataflow graphs depicted herein are simplified for illustrative purposes—the complexity of the dataflow graphs for actual services may include a few or even many more process nodes.)

Modeling applications using dataflow graphs facilitates identification of the percentage of the input traffic seen by each service. Because the application can be modeled as a dataflow graph, one can simply observe the traffic on specific queues between stages in the flow graph. This provides the required information about the relative percentages of the overall traffic that is going to each service.

The profile points P1-P6 in FIG. 5 represent profiled system states in a two-dimensional space comprising axes service 1 and service 2 corresponding to respective service combination use in the workload scenarios for which the binaries are compiled in block 300 above. For example, profile point P2, which has a service 1 value of 20 and a service 2 value of 80, represents a profiled system state under which 20% of the inbound traffic is processed using the dataflow graph of service 1 (service path 1), while the remaining 80% of the traffic is processed using the dataflow graph of service 2 (service path 2). Similarly, each of profile points P1 and P3-P6 represent profiled system states comprising respective use combinations of services 1 and 2. For simplicity, the profile points in FIG. 4 are selected as being equal in displacement; however, this is merely exemplary. In an actual implementation, one will typically attempt to model service use combinations corresponding to expected workload scenarios. Thus the development phase results in the compiler emitting a set of binaries along with a profile point for each binary representing the profile using which this binary was created. Compiler generated binaries for a particular profile are typically the most efficient for that profile. Hence, the profile point information emitted by the compiler for each binary is used at run time to determine the most efficient binary to load for a particular workload being experienced. This is explained in further detail in the following paragraphs.

After the development phase is completed, the host system is initialized (as described below) to effect run-time phase operations. During the run-time phase, network traffic workload conditions are monitored, and a profiled system state closest to the current condition is determined. In one embodiment, the workload (specifically, the service percentages) is determined at runtime by looking at the queues between stages and taking advantage of the dataflow nature of the application. The binary associated with that profiled system state is then loaded and executed. These operations are then repeated on an ongoing basis.

In a block 306, the current network traffic and relative service use is monitored to define a current system state corresponding to a current workload condition. For example, this type of operation is typically performed by maintaining statistical data on the percentage of incoming packets that are being processed by each service path in the data flow graph. A current workload point in the n-dimensional space corresponding to the current system state is then derived, with the values along each dimensional axis being the relative usage observed for the axis' associated service.

Next, in a block 308, the profile point in the n-dimensional space that is closest to the current workload point is determined. Since both the profiled system states and the current workload are modeled with points in the same n-dimensional space, the profile system state that is closest to the current workload can be determined in one embodiment by calculating the distances between the current workload point and the profiled points and selecting the profile point with the minimum distance. The distance D between any two points $(x_1, \ldots, x_n)$ and $(y_1, \ldots, y_n)$ in an n-dimensional space is given by the formula, $$D = \sqrt{\sum_{i=1}^{n} (x_i - y_i)^2} \qquad (1)$$

The binary associated with the profile point that is closest to the current workflow point is identified using Equation 1, and is then loaded and executed by the applicable resources on the host system, as depicted in a block 310. For example, under a current workload state W depicted in FIG. 5, the profiled system state represented by profile point P4 is the closest from among all of profile points P1-P6. Accordingly, the binary associated with profile point P4 would be loaded and executed.

As depicted by the arrow returning the processing from block 310 to block 306, the run-time operations of blocks 306, 308, and 310 are then repeated on an ongoing basis. Depending on the particular implementation, theses operations may be performed on a periodic basis, in response to detected traffic flow conditions, or a combination of the two.

Figure 6A:
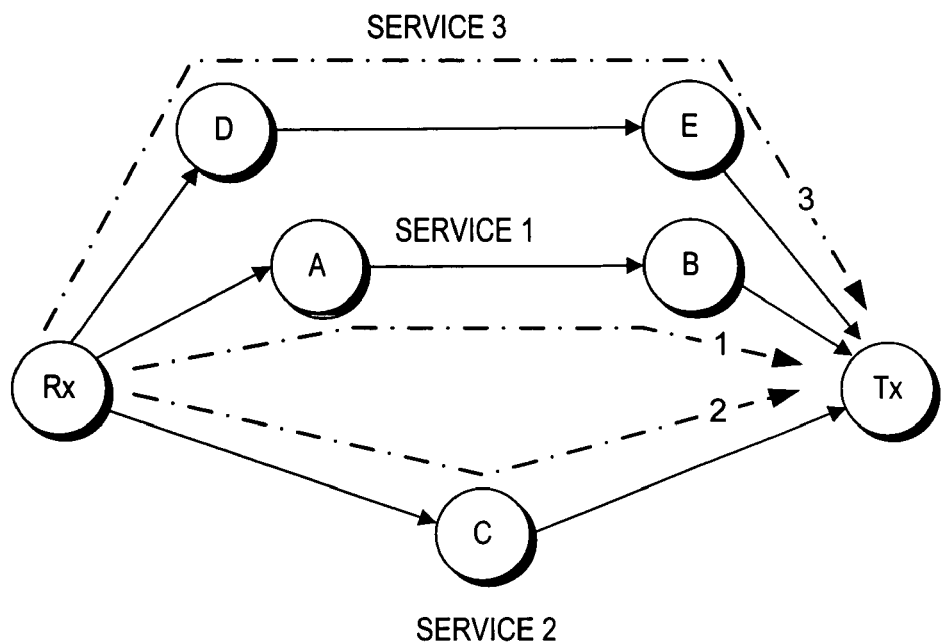
FIG. 6a a dataflow graph depicting service flows for three exemplary services.

The n-dimensional scheme may be extended to any number of services (i.e., dimensions) using techniques similar to those presented in FIGS. 4 and 5. For example, FIGS. 6a and 7 respectively show dataflow graphs and profile points corresponding to an exemplary application employing three services 1, 2 and 3. The dataflow graphs for services 1 and 2 are the same as shown in FIG. 4 and discussed above. Meanwhile, the dataflow graph for service 3 comprises a service path beginning at the Rx node, to a process node D, to a process node E, and finishing at the Tx node.

Figure 7:
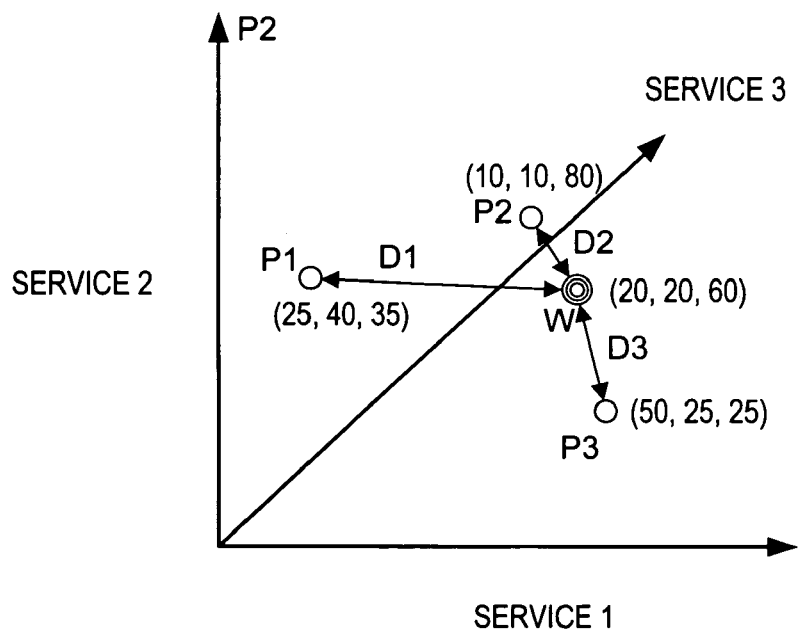

FIG. 7 shows three profile points P1, P2, and P3, each corresponding to a respective profiled system state. Under the profiled system state associated with profile point P1, 25% of the traffic is handled by service 1, 40% by service 2, and 35% by service 3. For profile point P2, the relative service levels for respective services 1, 2, and 3 are 10%, 10%, and 80%. Meanwhile, for profile point P3, the relative service levels for respective services 1, 2, and 3 are 50%, 25%, and 25%.

Under the current workload point W in FIG. 7, the relative service levels are 20% for service 1, 20% for service 2, and 60% for service 3. In accordance with the technique for determining which profiled system state is closest to the current workload state, respective distances D1, D2, and D3 between current workload point W and profile points P1, P2, and P3 are calculated using Equation 1, and a minimum distance is determined. In the example of FIG. 7, the minimum distance is D2, and thus the binary associated with profile point P2 will be loaded and executed.

As discussed above, processes relating to different services are generally not performed in isolation. Rather, there is an interaction between the processes. Such interactions can be either indirect or direct. Under indirect interaction, different processes associated with different services attempt to access a common set of shared resources at the same time, leading to access conflicts and associated latencies. Oftentimes, these interactions lead to significant reductions in the efficiency for an application.

For example, an individual application may be tuned based on a given profiled system state, and anticipated latencies corresponding to associated services, such as reading or writing data to a DRAM store. Such an application, running under the given profiled system state, may run very well. However, a deviation from the profiled system state may result in significant reductions in performance.

As discussed above, many services are performed using a parallel pipelined architecture. Under such an architecture, threads are dispatched based on a predetermined sequence of events, with the timing of the thread dispatches corresponding to projected process latencies and anticipated resource availabilities. Suppose an application is tuned for the workload condition corresponding to point P2 in FIG. 6a, wherein 10% of the traffic is processed by service 1, 10% by service 2, and 80% by service 3. As one might expect, the binary for this profiled system state would place emphasis on efficiently processing packets for service 3, while placing less emphasis on the processing speeds for services 1 and 2. Now suppose that there is a "cross-coupling" effect between the processes of service 3 (as represented by process D node and process E node) and the processes of another service (service 1 and/or service 2). For instance, the implementations of process node A node and process node D may both access shared memory resources.

In view of the foregoing, now consider what happens if a change in traffic occurs, under which the relative service usage for application 1 increases. As a result, the number of memory accesses performed by process node A also increases. This may produce a significant detuning effect for service 3, since the anticipated memory access latency for which the previous system state was tuned is now greater for service 3. Depending on how much of a "bottleneck" is produced, the efficiency of service 3 might show little to large reductions. Two or more service flows that are adversely affected by such indirect effects are referred to herein as "loosely-coupled" services.

Figure 6B:
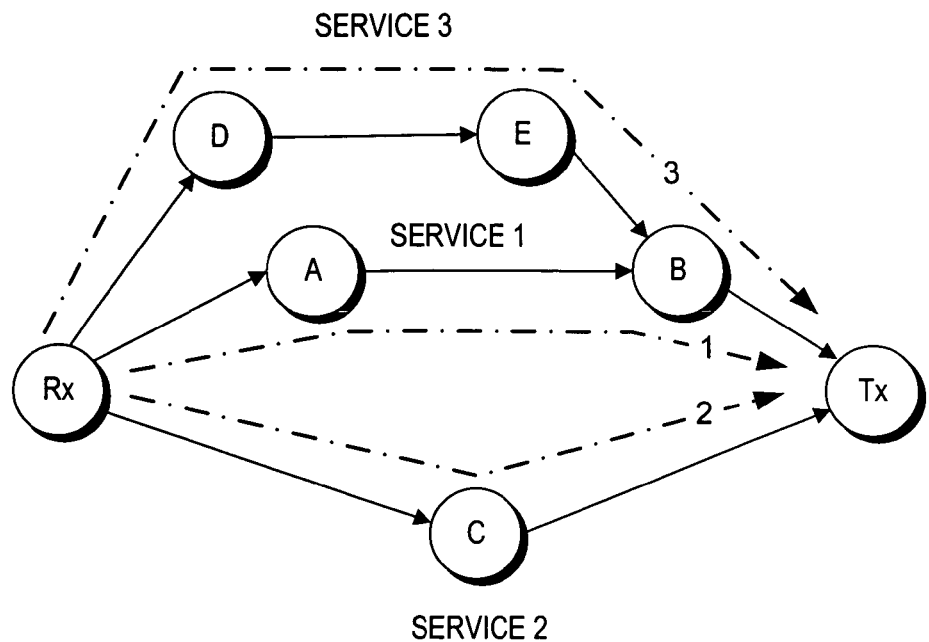
FIG. 6b is a dataflow graph depicting service flows for three exemplary services, wherein two services employ a common process node.

Now consider the efficiency effects causes by a direct interaction between service processes. Such a situation is illustrated in FIG. 6b, wherein each of services 1 and 3 share the process node B. In this instance, an increase in the use of one service will have a direct adverse affect on the efficiency of the other service. Services that are adversely affected by such direct effects are referred to herein as "closely coupled" services.

In view of the existence of such loosely-coupled and/or closely-coupled services, more sophisticated schemes may be necessary to determine the most efficient binary for a given system state. For example, this may be needed when the profiled system states have different scopes of applicability. There might be a profiled state that generates very efficient binaries for the specific workload that it was compiled for, but is not as efficient if the actual workload deviates even slightly from the profiled workload. For instance, there might be a profiled state that generates very efficient binaries for a workload comprising only a single service, but might not be as efficient if the traffic requires additional services. Under such a situation, another, more "generic" profiled state that generates binaries for two services (even though the actual percentages of the services while profiling are different from the actual workload) might be better suited for handling the workload than the profiled state optimized for one service.

One approach for differentiating amongst profiled system states is to associate weights with each profiled state, and employ such weights in the closest profiled state determination. In one implementation, a generic profiled state (that which results in efficient execution for a large range of workloads) can be assigned a smaller weight that a less-generic profiled state, such that the distance between the generic state and a current system state is reduced relative to the less-generic state.

In another embodiment, different weights can be assigned to associated dimensions for a given profiled system state. Under this approach, a smaller weight is assigned to a dimension for which a change in workload along that dimension has a relatively small adverse effect, while a larger weight is assigned to a dimension for which a change causes a relatively large adverse effect. Weighting factors may be employed to augment Equation 1 in the following manner to facilitate a "weighted" distance measurement:

$$D = \sqrt{\sum_{i=1}^{n} (x_i - y_i)^2 \, w_i} \quad (2)$$

where $w_i$ is a weight factor along dimension i.

Figure 8:
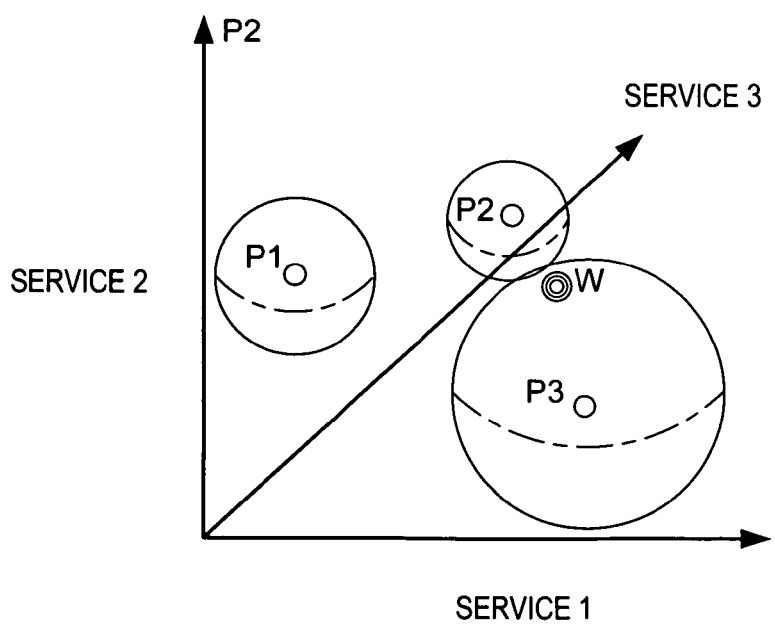
FIG. 8 is a diagram illustrating spheres surrounding respective profile points in a three-dimensional space, wherein the spheres are employed to determine a closest profiled system state to a current workload condition.

Another extension to the method involves associating a circle or an n-dimensional sphere around each or selected profiled system state points in the n-dimensional space. An exemplary set of spheres around profile points P1, P2, and P3 for a three-dimensional space are shown in FIG. 8. The size of the spheres can be derived as a function of the "genericness" for a given profiled system state. The more generic a state (meaning a change in the state produces a relatively small change in efficiency for the services), the larger the diameter of the sphere.

In the example illustrated in FIG. 8, the diameter of the sphere for P3 is larger than the diameter of the sphere for P1, which, in turn, is larger than the diameter for P2. Accordingly, profile point P3 represents a relatively generic system state (with respect to the effect on the efficiency of the binary associated with this profiled system state when a deviation away from the system state is encountered). Meanwhile, a small deviation in the system state away from profile point P2 results in a significant reduction in the efficiency of P2's associated binary. As a result, the best binary for current workload state W is actually the binary associated with profile point P3 rather than P2 under the Figure-8 scheme.

Under some circumstances, a workload point will fall within multiple circles or n-dimensional spheres. Under such a case, the closest profile point is determined by identifying the circle or n-dimensional sphere the workload point is furthest inside of, on a relative basis. In one embodiment, this can be determined by comparing the ratio of the distance between the profile point and the workload point versus the radius of the corresponding n-dimensional circle or sphere. The profile point yielding the lowest ratio is identified as the closest profile point.

Figure 9:
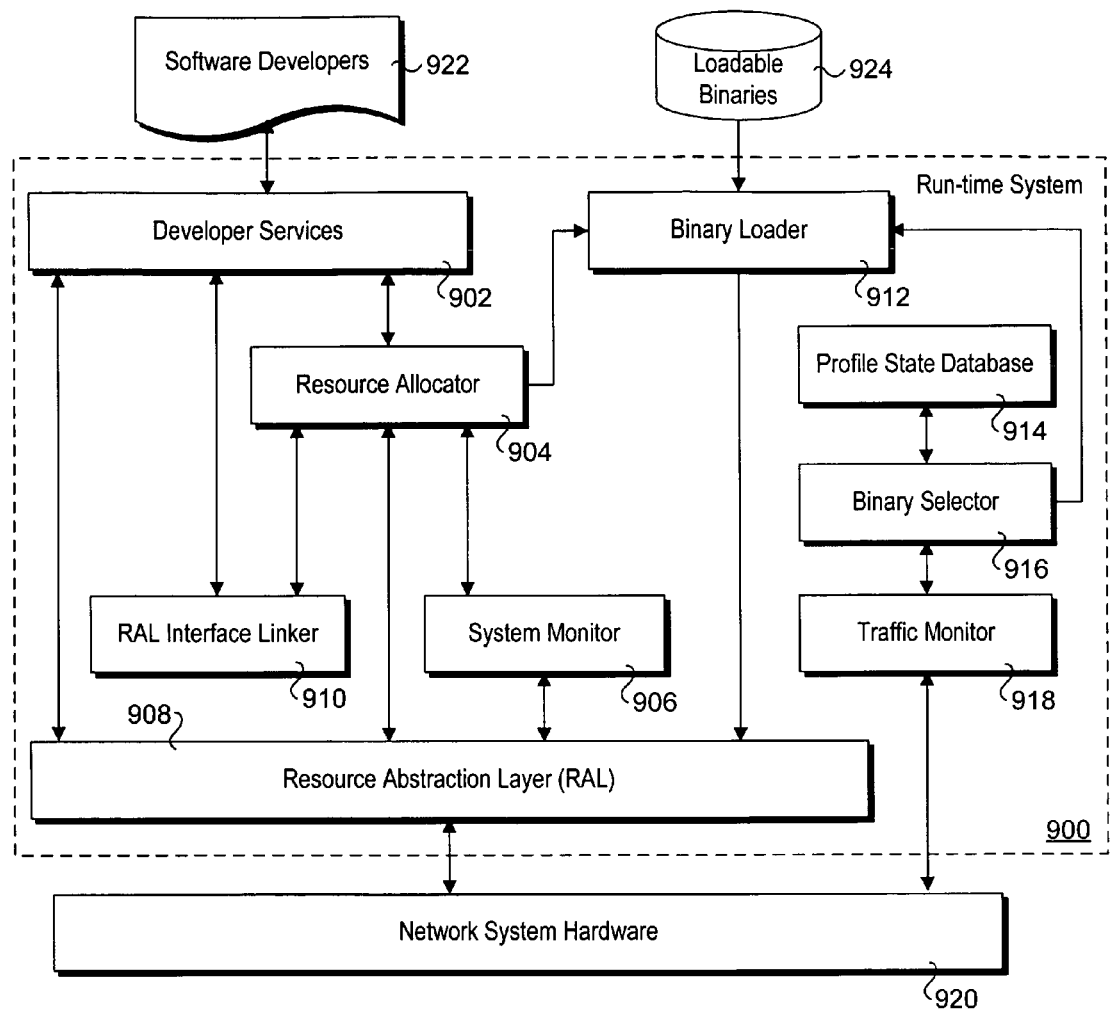
FIG. 9 is a block diagram illustrating a software architecture for facilitating software development and run-time operations in accordance with the embodiments discussed herein.

FIG. 9 depicts a software architecture used for implementing aspects of the embodiments described above. At the heart of the architecture is a run-time system (RTS) 900. The run-time system components include developer services 902, a resource allocator 904, a system monitor 906, a resource abstraction layer (RAL) 908, a RAL interface linker 910, a binary loader 912, a profile state database 914, a binary selector 916, and a traffic monitor 918. Each of the resource abstraction layer 908 and the traffic monitor 918 interfaces to network system hardware 920, which is representative of the hardware employed by the host network system or device the software is executed on.

The software architecture of FIG. 9 supports two overall functions. First, the architecture provides a development environment that assists software developers 922 in writing and debugging application code and RTS code. Second, the RTS components support dynamic determination of the most efficient binaries from loadable binaries 924 to be loaded and executed for current traffic conditions on an ongoing basis.

The software development aspects of the architecture are generally supported by developer services 902, resource allocator 904, resource abstraction layer 908, and RAL interface linker 910. Developer services 902 comprise components that provide services to developers writing and debugging application code and RTS code. These services include support for downloading and manipulation of application files, debugging code, and providing a user interface to the run-time system. The developer services components are generally intended for target systems while software is in development.

The resource abstraction layer 908 comprises a set of interfaces abstracting hardware resources that are commonly present in programmable network systems and devices. The resource allocator 904 maps the code implementing service processes to processing units and RAL interface instances in those service processes to RAL interface implementations. It also handles the resource allocations needed to use an instance of a particular RAL interface implementation. Once the mapping of software resources to hardware resources is done, the RAL interface linker 910 is responsible for linking the service process binaries (containing the application logic) to RAL binaries (containing the actual implementations of the abstract resources).

Operations corresponding to the run-time phase of FIG. 3 are supported by the remaining run-time system components, along with resource abstraction layer 908 and resource allocator 904. During ongoing operations, traffic monitor 918 monitors traffic flows and maintains statistics and the like on service usage. Based on this information, the traffic monitor outputs current workload state information to binary selector 916. Meanwhile, data corresponding to the profiled system states for which respective loadable binaries 924 are generated by the compiler are stored as points in n-dimensional space in profile state database 914. In view of current workload state inputs provided to binary selector 916 from traffic monitor 918, binary selector selects the appropriate (i.e., most efficient) binary from loadable binaries 924 based on the applicable selection scheme (e.g., minimum distance, weighted distance scheme, circle/sphere scheme, etc.)

Once the binary is selected, it cannot simply be loaded into the control stores of the computer engines directly. Rather, the binary loader 912 is provided with a new binary set and a resource mapping generated by resource allocator 904 in view of current resource usage monitored by system monitor 906. The binary loader then checkpoints the currently running system so that it stops at a safe location during execution, loads in the new binaries on network system hardware 920 based on the specified mapping, and restarts the system for execution.

Figure 10:
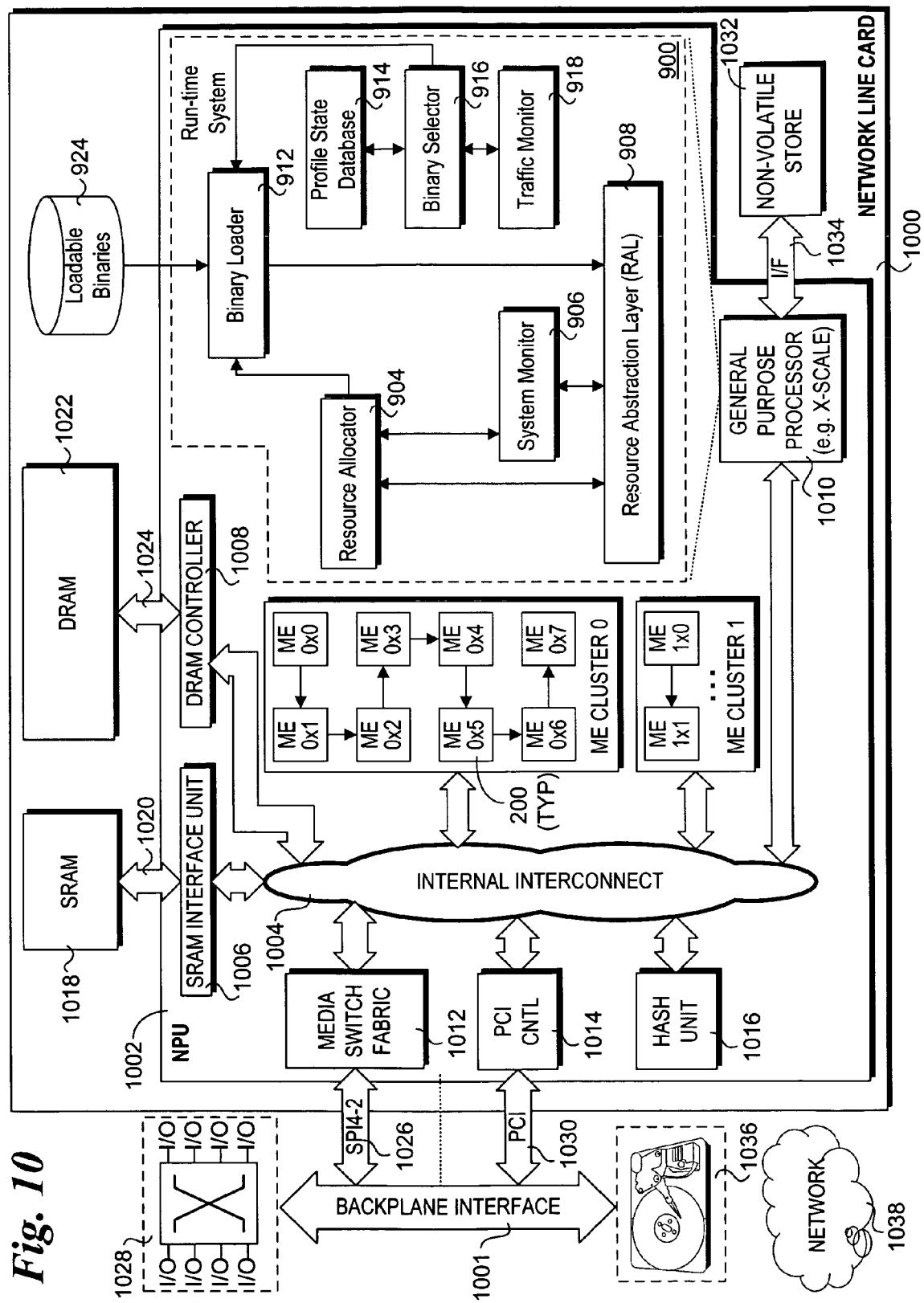
FIG. 10 is a schematic diagram of an exemplary network line card on which aspects of the embodiments discussed herein may be implemented.

FIG. 10 shows a network line card 1000 that may be employed in a network system or device to effect aspects of the embodiments described herein. In general, network line card 1000 is illustrative of various types of network system line cards employing standardized or proprietary architectures. For example, a typical line card of this type may comprise an Advanced Telecommunications and Computer Architecture (ATCA) modular printed circuit board (PCB) that is coupled to a common backplane in an ATCA chassis that may further include other ATCA modular boards. Accordingly the line card includes a set of connectors coupled to its PCB to mate with mating connectors on the backplane, as illustrated by a backplane interface 1001. In general, backplane interface 1001 supports communication via various input/output (I/O) communication channels, as well as provides power to network line card 1000. For simplicity, only selected I/O interfaces are shown in FIG. 10, although it will be understood that other I/O and power input interfaces also exist.

The network line card employs a network processor unit (NPU) 1002 that includes n compute engines (e.g., microengines 200) that run sets of execution threads corresponding to the binaries referenced herein. In one embodiment, n=8, while in other embodiment n=16, 24, or 32. Other numbers of microengines 200 may also me used. In the illustrated embodiment, 16 microengines 200 are grouped into two clusters of 8 microengines, including an ME cluster 0 and an ME cluster 1 (the latter showing only 2 microengines for simplicity).

Each of microengines 200 is connected to other NPU components via sets of bus and control lines referred to as the processor "chassis". For simplicity and clarity, these bus sets and control lines are depicted as an internal interconnect 1004. Also connected to the internal interconnect are an SRAM controller 1006, a DRAM controller 1008, a general purpose processor 1010, a media switch fabric interface 1012, a PCI (peripheral component interconnect) controller 1014, and a hash unit 1016. Other components not shown that may be provided by network processor 1002 include, but are not limited to, encryption units, scratch memory, a CAP (Control Status Register Access Proxy) unit, and a performance monitor.

The SRAM controller 1006 is used to access an external SRAM store 1018 via an SRAM interface 1020. Similarly, DRAM controller 1008 is used to access an external DRAM store 1022 via a DRAM interface 1024. In one embodiment, SRAM interface 1020 comprises a multi-channel interface and SRAM store comprises a quad data rate (QDR) SRAM. In one embodiment, DRAM store 1022 employs DDR (double data rate) DRAM. In other embodiment DRAM store may employ Rambus DRAM (RDRAM) or reduced-latency DRAM (RLDRAM). Other types of memories may also be employed for each of the SRAM and DRAM stores.

Media switch fabric interface 1012 is used to interface with the media switch fabric for the network element in which the line card is installed. In one embodiment, media switch fabric interface 1012 employs a System Packet Level Interface 4 Phase 2 (SPI4-2) interface 1026. In general, the actual switch fabric may be hosted by one or more separate line cards, or may be built into the chassis backplane. Both of these configurations are illustrated by switch fabric 1028 in FIG. 10.

PCI controller 1014 enables NPU 1002 to interface with one or more PCI devices that are coupled to backplane interface 1001 via a PCI interface 1030. In one embodiment, PCI interface 1030 comprises a PCI Express interface.

The services corresponding to one or more applications hosted by the network system are implemented via execution of corresponding software components on MEs 200 and general-purpose processor 1010. Typically, a binary for a given application comprises sets of instruction threads that are executed on selected MEs using a coordinated approach, such as discussed above for the context pipeline and function pipeline schemes. Fast path operations (operations relating to packet-processing at line-rate speeds, also referred to a dataplane operations) are generally implemented via execution of corresponding service threads on the MEs. Meanwhile, slow path operations (operations performed on packets that need not meet line-rate speed requirements) and control plane operations are generally implemented via execution of instructions on general-purpose processor 1010. However, in some implementations, a portion of the MEs may be sequestered for performing slow path operations. In a similar manner, the various software components of run-time system 900 may be implemented via execution of corresponding instructions on either general-purpose processor 1010 (as illustrated in FIG. 10), selected MEs, or a combination of the two.

During initialization of network line card 1000, a first portion of coded instructions (e.g., microcode) to facilitate various packet-processing functions and operations are loaded into the control stores 212 of MEs 200. Similarly, a second portion of the instructions is loaded into DRAM 1022 for execution on general-purpose processor 1010. In one embodiment, the instructions are loaded from a non-volatile store 1032 hosted by network line card 1100, such as a flash memory device. Other examples of non-volatile stores include read-only memories (ROMs), programmable ROMs (PROMs), and electronically erasable PROMs (EEPROMs). In one embodiment, non-volatile store 1032 is accessed by general-purpose processor 1010 via an interface 1034. In another embodiment, non-volatile store 1032 may be accessed via an interface (not shown) coupled to internal interconnect 1004.

In addition to loading the instructions from a local (to line card 1000) store, instructions may be loaded from an external source. For example, in one embodiment, the instructions are stored on a disk drive 1036 hosted by another line card (not shown) or otherwise provided by the network system in which line card 1000 is installed. In yet another embodiment, the instructions are downloaded from a remote server or the like via a network 1038 as a carrier wave.

During initialization, sets of instruction threads corresponding to one or more binaries for one or more respective applications to run on the network line card are loaded from one or more of non-volatile store 1032, disk drive 1036, and via network 1038. During run-time operations, the original sets of instructions may be replaced by other binaries in view of changing network traffic in the manner described herein. As was the case in FIG. 9, such binaries are depicted in FIG. 10 as being loaded from loadable binaries 924. In general, the loadable binaries will typically be stored on disk drive 1036 or loaded via network 1038. In instances in which the collective size of the loadable binaries are relatively small, the may be stored in non-volatile store 1032.

As discussed throughout, various operations and functions corresponding to aspects of the embodiments of the invention discussed herein are implemented via execution of coded instructions. Thus, embodiment of the invention may comprise software embodied as sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    compiling a respective application binary for each of a plurality of profiled system states in a network system, each profiled system state corresponding to a respective workload scenario;
    monitoring a current workload condition for the network system;
    identifying an application binary from amongst the respective application binaries that is most efficient for the current workload condition;
    loading and executing that application binary on the network system;
    modeling each profiled system state as a profile point in an n-dimensional space, wherein n corresponds to the number of service paths in an application and each dimension is associated with a respective service path, and wherein a value along a given dimension for the profile point corresponds to a relative percentage of traffic that is handled by that dimension's associated service path for the profiled system state;

modeling a current workload condition as a workload point in the n-dimensional space;

determining a profile point that is closest to the workload point; and identifying the application binary associated with that profile point, the application binary that is identified being loaded and executed on the network system.

2. The method of claim 1, further comprising:
repeatedly performing the operations of monitoring the current workload condition, identifying the most efficient application binary, and loading and executing that binary on an ongoing basis.

3. The method of claim 1, wherein the closest profile point is determined by the equation, $$D = \sqrt{\sum_{i=1}^{n} (x_i - y_i)^2}$$

wherein D is the distance between a profile point and the workload point, $x_i$, is the displacement of the profile point along an $i^{th}$ dimension, and $y_i$ is the displacement of the workload point along the $i^{th}$ dimension.

4. The method of claim 1, further comprising:
implementing a weighted distance scheme to determine the profile point that is closest to the workload point, wherein an application binary that exhibits a lower reduction in efficiency when a workload condition deviates from that application binary's associated profiled system state is assigned a lower weight than an application binary that exhibits a higher reduction in efficiency due to a similar deviation.

5. The method of claim 4, wherein a weight parameter is assigned to a given dimension for a profile point based on a relative reduction in efficiency for the corresponding application binary when an actual workload deviates from the profile point along that dimension, and wherein the closest profile point is determined by the equation, $$D = \sqrt{\sum_{i=1}^{n} (x_i - y_i)^2 \, w_i}$$

wherein D is the weighted distance between a profile point and the workload point, $x_i$, is the displacement of the profile point along an $i^{th}$ dimension, $y_i$ is the displacement of the workload point along the $i^{th}$ dimension, and $w_i$, is a weight factor along the $i^{th}$ dimension.

6. The method of claim 1, further comprising:
determining a weighting parameter associated with a relative reduction in efficiency for an application binary when a workload condition deviates from that application binary's associated profiled system state based on a cross-coupling effect between service paths for the application; and
employing the weighting factor in the determination of which profile point is closest to the workload point.

7. The method of claim 1, further comprising:
associating an n-dimensional circle or sphere for a profile point in the n-dimensional space, a diameter of the n-dimensional circle or sphere based on a relative level of reduction in efficiency for the profile point's associated application binary when a workload condition deviates from the profiled system state for the profile point; and
determining which profile point is closest to the workload point by determining in which n-dimensional circle or sphere the workload point resides.

8. The method of claim 7, wherein the workload point resides within multiple n-dimensional circles or spheres, and the closest profile point is determined by comparing the ratio of the distance between the profile point and the workload point versus the radius of the n-dimensional circle or sphere, with the profile point yielding the lowest ratio identified as the closest profile point.

9. The method of claim 1, wherein the operation of compiling a respective application binary for each of a plurality of profiled system states comprises:
compiling an original binary with added instrumentation code targeted for an execution environment provided by the network system;
defining a plurality of workload scenarios, each corresponding to a respective traffic condition predicted for the network system producing an associated profiled system state;
generating training data corresponding to each workload scenario;
executing the original binary using the training data generated for each workload scenario to obtain respective profiled statistics for the profiled system state associated with that workload scenario; and
compiling the original binary using the profiled statistics for each profiled system state to generate the application binary for that profiled system state.

10. The method of claim 9, further comprising:
generating a plurality of profile points in an n-dimensional space, each profile point being associated with a respective profiled system state and having respective dimensions in the n-dimensional space corresponding to the relative percentage usage of each dimension's associated service flow for the associated profiled system state.

11. The method of claim 1, wherein the network system employs at least one multi-core processor.

12. The method of claim 1, wherein an application binary comprises a plurality of instruction threads to be executed on a processor having a plurality of compute engines.

13. A machine-readable storage medium, to provide instructions to be executed on a network system to perform operations comprising:
monitoring a current workload condition for the network system;
identifying an application binary from among a plurality of application binaries that is most efficient for the current workload condition, each application binary tuned for a corresponding profiled system state;
loading and executing that application binary on the network system;
modeling a current workload condition as a workload point in an n-dimensional space, wherein n corresponds to a number of service paths in an application and each dimension is associated with a respective service path, and wherein the value along a given dimension for a given point corresponds to the relative percentage of the traffic that is handled by that dimension's associated service path for a given system state;
determining a profile point from amongst a plurality of profile points in the n-dimensional space that is closest to the workload point, each profile point in the n-dimensional state being associated with a respective profiled system state and having respective dimensions corresponding to the relative percentage usage of each dimension's associated service flow for the associated profiled system state; and identifying the application binary associated with that profile point, the application binary that is identified being loaded and executed on the network system.

14. The machine-readable storage medium of claim 13, wherein execution of the instructions performs further operations comprising:

implementing the equation, $$D = \sqrt{\sum_{i=1}^{n} (x_i - y_i)^2}$$

to determine the distance D between a profile point and the workload point, wherein $x_i$, is the displacement of the profile point along an $i^{th}$ dimension, and $y_i$ is the displacement of the workload point along the $i^{th}$ dimension.

15. The machine-readable storage medium of claim 13, wherein execution of the instructions performs further operations comprising:

implementing a weighted distance scheme to determine the profile point that is closest to the workload point, wherein an application binary that exhibits a lower reduction in efficiency when a workload condition deviates from that application binary's associated profiled system state is assigned a lower weight than an application binary that exhibits a higher reduction in efficiency due to a similar deviation.

16. The machine-readable storage medium of claim 13, wherein an n-dimensional circle or sphere is associated with a respective profile point in the n-dimensional space, a diameter of the n-dimensional circle or sphere based on a relative level of reduction in efficiency for the profile point's associated application binary when a workload condition deviates from the profiled system state the application binary was tuned for, and wherein execution of the instructions performs further operations comprising:

determining which profile point is closest to the workload point by determining in which n-dimensional circle or sphere the workload point resides.

17. A network line card, comprising: a printed circuit board (PCB) including a backplane interface; a network processor, mounted on the PCB operatively coupled to the backplane interface and including, an internal interconnect comprising a plurality of command and data buses; a plurality of multi-threaded compute engines communicatively-coupled to the internal interconnect; and a general-purpose processor communicatively-coupled to the internal interconnect; and a storage device, having coded instructions stored therein to execute on at least one of the compute engines and general-purpose processor to perform operations comprising: monitoring a current workload condition for the network line card; identifying an application binary from among a plurality of application binaries that is most efficient for the current workload condition, each application binary tuned for a corresponding profiled system state; and loading and executing that application binary on least one of the plurality of compute engines and the general-purpose processor; storing a plurality of profile points in the profile state database, each profile point associated with a respective profiled system state and comprising a point in an n-dimensional space, wherein n corresponds to the number of service paths in an application and each dimension is associated with a respective service path, and wherein the displacement along a given dimension for the profile point corresponds to the relative percentage of the traffic that is handled by that dimension's associated service path under the profiled system state; modeling a current workload condition as a workload point in the n-dimensional space; determining a profile point that is closest to the workload point; and identifying the application binary associated with that profile point, the application binary that is identified being loaded and executed on at least one of the plurality of compute engines and the general-purpose processor.

18. The network line card of claim 17, wherein the coded instructions are embodied as a plurality of components, including:

a traffic monitor to monitor traffic conditions and derive a current workload condition thereof;

a profile state database, to store profiled system state data associated with each of the plurality of application binaries;

a binary selector, to select a most efficient application binary in view of a current workload condition input from the traffic monitor and profiled system state data in the profile state database; and a binary loader, to load the selected application binary from a storage device on which the plurality of application binaries are stored for execution on at least one of the plurality of compute engines and the general-purpose processor.

19. A method comprising:

compiling a respective application binary for each of a plurality of profiled system states in a network system, each profiled system state corresponding to a respective workload scenario;

monitoring a current workload condition for the network system;

identifying an application binary from amongst the respective application binaries that is most efficient for the current workload condition; and loading and executing that application binary on the network system, wherein compiling the respective application binary for each of the plurality of profiled system states includes:

compiling an original binary with added instrumentation code targeted for an execution environment provided by the network system;

defining a plurality of workload scenarios, each corresponding to a respective traffic condition predicted for the network system producing an associated profiled system state;

generating training data corresponding to each workload scenario;

executing the original binary using the training data generated for each workload scenario to obtain respective profiled statistics for the profiled system state associated with that workload scenario; and compiling the original binary using the profiled statistics for each profiled system state to generate the application binary for that profiled system state.

* * * * *